United States Patent
Neubauer

(10) Patent No.: US 7,106,807 B2
(45) Date of Patent: Sep. 12, 2006

(54) METHOD FOR ESTIMATING THE FREQUENCY SHIFT OF A CPFSK SIGNAL

(75) Inventor: Andre' Neubauer, Krefeld (DE)

(73) Assignee: Infineon Technologies AG, (DE)

( * ) Notice: Subject to any disclaimer, the term of this patent is extended or adjusted under 35 U.S.C. 154(b) by 763 days.

(21) Appl. No.: 10/168,122

(22) PCT Filed: Dec. 13, 2000

(86) PCT No.: PCT/EP00/12676

§ 371 (c)(1),
(2), (4) Date: Sep. 16, 2002

(87) PCT Pub. No.: WO01/45339

PCT Pub. Date: Jun. 21, 2001

(65) Prior Publication Data

US 2003/0108121 A1    Jun. 12, 2003

(30) Foreign Application Priority Data

Dec. 17, 1999   (DE) ................................ 199 61 123

(51) Int. Cl.
*H03K 7/06*   (2006.01)
*H04L 27/20*   (2006.01)

(52) U.S. Cl. ...................... 375/305; 375/308; 332/100; 332/103

(58) Field of Classification Search ................ 375/272, 375/274, 279, 282, 283, 303, 305, 308, 329–330, 375/333–334, 336, 361; 332/100, 103, 117, 332/144
See application file for complete search history.

(56) References Cited

U.S. PATENT DOCUMENTS

| 4,414,675 | A | * | 11/1983 | Comroe | ...................... 375/274 |
| 4,890,302 | A | | 12/1989 | Muilwijk | |
| 5,253,097 | A | * | 10/1993 | Naito et al. | ................. 398/205 |
| 5,825,257 | A | * | 10/1998 | Klymyshyn et al. | ........ 332/100 |

(Continued)

FOREIGN PATENT DOCUMENTS

JP      57131153      8/1982

(Continued)

OTHER PUBLICATIONS

D'Andrea, A.N. et al.; "Digital Carrier Frequency Estimation For Multilevel CPM Signals", Jun. 18, 1995, pp. 1041-1045.

(Continued)

*Primary Examiner*—Young T. Tse

(74) *Attorney, Agent, or Firm*—Holme, Roberts & Owen, LLP; David O. Seeley, Esq.; Jeffery M. Lillywhite

(57) ABSTRACT

A method for estimating the frequency shift of a CPFSK signal includes scanning the CPFSK signal. Intermediate signal values are determined for the scanned CPFSK signal. An estimated value (v) is determined for the frequency shift of the CPFSK signal by assessing a predefined number of $L_0$ consecutive intermediate signal values. An integer delay parameter D is specified. Intermediate signal values for intervals $k \cdot T + \tau$ are determined in each case from scanning values of the CPFSK signal obtained for intervals $k \cdot D \cdot T + \tau$ and $[k-1] \cdot D \cdot T + \tau$, whereby T designates a scanning period of the scanned CPFSK signal, k is a scanning index and $\tau$ is a delay constant. The estimated value (v) for the frequency shift is determined from the intermediate signal values for intervals $i \cdot D \cdot T + \tau$ with $i = 0 \ldots L_0 - 1$. The integer delay parameter D is variable and is selected depending on the type of CPFSK modulation used for the CPFSK signal.

6 Claims, 1 Drawing Sheet

U.S. PATENT DOCUMENTS

| | | | | |
|---|---|---|---|---|
| 6,272,072 B1 | * | 8/2001 | Wulich et al. | 367/124 |
| 6,411,646 B1 | * | 6/2002 | Walley et al. | 375/146 |
| 6,546,237 B1 | * | 4/2003 | Glas | 455/324 |
| 6,829,317 B1 | * | 12/2004 | Mege et al. | 375/368 |
| 2003/0043947 A1 | * | 3/2003 | Zehavi et al. | 375/365 |

FOREIGN PATENT DOCUMENTS

| | | |
|---|---|---|
| JP | 63160448 | 7/1988 |

OTHER PUBLICATIONS

Morelli, M. et al., "Feedforward Carrier Frequency Estimation With MSK-Type Signals", *IEEE Communications Letters*, vol. 2, No. 8, Aug. 1998, pp. 235-237.

Caire, Giuseppe et al., "A New Symbol Timing And Carrier Frequency Offset Estimation Algorithm For Noncoherent Orthogonal *M*-CPFSK", *IEEE*, Oct. 1997, pp. 1314-1326.

Umberto Mengali and Aldo N. D'Andrea; Synchronization Techniques for Digital Receivers; p. 177; Plenum Press, New York and London.

* cited by examiner

METHOD FOR ESTIMATING THE FREQUENCY SHIFT OF A CPFSK SIGNAL

BACKGROUND OF THE INVENTION

1. Field of the Invention

This invention relates to an estimation method, and more specifically to a method for estimating the frequency shift of a CPFSK signal.

2. Description of the Related Art

Digital receiver systems for frequency or phase modulated signals, in particular for CPFSK signals ("Continuous Phase Frequency Shift Keying") frequently also require, for correct and highly efficient detection of the transmitted symbols, apart from symbol synchronisation, digital estimation and correction of a possible phase or frequency shift.

For the purpose of estimating the frequency shift intuitive methods are used which employ known signal characteristics or characteristics from signals derived from the incoming signal, as well as methods which are based on the so-called ML principle ("Maximum Likelihood"). In this case basically a distinction is made between data-aided and non-data-aided as well as clock-aided and non-clock-aided methods. In addition a distinction can be made between estimating methods without feed back (feed forward or open loop) and estimating methods with feed back (closed loop).

In "Synchronisation Techniques for Digital Receivers" U. Mengali and A. N. D'Andrea, Plenum Press, New York, 1997 a number of known methods for estimating the digital frequency shift are described whereby in particular a non-data-aided, though clock-aided estimating method for MSK signals ("Minimum Shift Keying") is presented, which relies on the so-called "Delay and Multiply" principle. A differential demodulator is used as an essential component in this case. This known method will be explained below in more detail.

With this known method it is firstly assumed that an MSK incoming signal r(t) is filtered for noise limitation and the resultant filtered MSK incoming signal x(t) is scanned at predetermined intervals kT+τ, whereby k designates the scanning index, T the symbol duration of the incoming signal and τ a delay constant. As described in more detail in "Synchronisation Techniques for Digital Receivers", U. Mengali and A. N. D'Andrea, Plenum Press, New York, 1997, an intermediate signal z(k·T+τ) can be derived from the filtered and scanned complex envelope x(k·T+τ) of the incoming signal (as well as the corresponding conjugated complex signal x*(k·T+τ)) as follows:

$$z(k \cdot T+\tau)=x^2(k \cdot T+\tau) \cdot \{x^2([k-1] \cdot T+\tau)\}^* = \{x(k \cdot T+\tau) \cdot x^*([k-1] \cdot T+\tau)\}^2$$

This intermediate signal gives the estimated value for the frequency shift ν by assessing an observation interval including $L_0$ receiver symbols:

$$\nu = -\frac{1}{4\pi T} \cdot \arg\{z(\tau) + z(T+\tau) + z(2 \cdot T+\tau) + \ldots + z([L_0-1] \cdot T+\tau)\} = -\frac{1}{4\pi T} \cdot \arg\left\{\sum_{k=0}^{L_0-1} z(k \cdot T+\tau)\right\}$$

As already mentioned, the method described above however concerns a model developed for MSK incoming signals. During MSK modulation the carrier phase during the time T of a symbol is rotated around the amount $$\pm \frac{\pi}{2},$$

so that the frequency of the transmitted signal, dependent on the symbol being transmitted, changes between $$\varpi_0 + \frac{\pi}{2 \cdot T}$$

and $$\varpi_0 - \frac{\pi}{2 \cdot T},$$

whereby $\omega_0$ designates the nominal carrier frequency.

In the case of angle-modulated signals the phase of the carrier signal is changed in harmony with a phase function q(t) of a suitable phase filter. For MSK signals the phase function is defined as follows:

$$q(t) = \begin{cases} 0 & t < 0 \\ \dfrac{t}{T} & 0 \le t < T \\ 1 & t > T \end{cases}$$

The phase function q(t) therefore assumes its end value after the duration T of a transmitted symbol.

CPFSK signals however generally possess a phase function, in contrast to MSK signals, which only reach their end value after an interval of time L·T where L>1, that is to say the phase function q(t) for CPFSK signals is defined as follows:

$$q(t) = \begin{cases} 0 & t < 0 \\ q(t) & 0 \le t < L \cdot T \\ 1 & t > L \cdot T \end{cases}$$

BRIEF SUMMARY OF THE INVENTION

The aim of this invention, based on the state of the art described above, is to provide for CPFSK signals a generally valid method to estimate frequency shift.

The features of the present invention will become more fully apparent from the following description, or may be learned by the practice of the invention as set forth hereinafter.

According to the invention to estimate the frequency shift of a CPFSK signal an integer delay parameter D is introduced which can be suitably adjusted depending on the type of the CPFSK signal or the type of modulation selected in each case.

The CPFSK signal is scanned at intervals k·T+τ, whereby T designates the scanning period, k a scanning index and τ a delay constant. Intermediate signal values in each case are calculated from the scanning values of the CPFSK signal obtained for the intervals k·D·T+τ and [k−1]·D·T+τ. The estimated value for the frequency shift is then obtained from a number of $L_0$ intermediate signal values that have previously been determined for the intervals $i \cdot D \cdot T + \tau$ ($i = \ldots L_0 - 1$).

In particular the estimated value for the frequency shift can be obtained by calculation of the expression $$\frac{1}{4 \cdot \pi \cdot D \cdot T} \cdot \arg\left\{\sum_{i=0}^{L_0-i} z(i \cdot D \cdot T + \tau)\right\},$$

whereby $z(i \cdot D \cdot T + \tau)$ designates the intermediate signal value obtained for the interval $i \cdot D \cdot T + \tau$.

The estimating method according to the invention is generally valid for CPFSK signals and is also to be implemented favourably as regards complexity. Furthermore very good estimation results can also be achieved for short observation periods, that is to say for minimum $L_0$ values The invention is explained in more detail below with reference to the attached drawing.

DETAILED DESCRIPTION OF THE EXEMPLARY EMBODIMENTS

Figure 1:
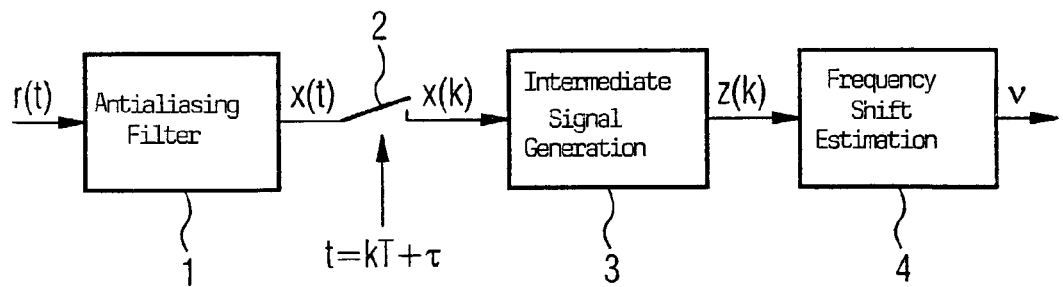
FIG. 1 shows the principal structure of an arrangement to estimate frequency shift of a signal, and FIG. 2 to highlight the advantages of this invention shows an illustration of the mean frequency shift estimated using a method according to the invention in comparison to the actual frequency shift.

An arrangement to estimate the frequency shift or frequency offset $\nu$ of a signal r(t) received by a digital receiver is illustrated in FIG. 1.

Since the incoming signal r(t), apart from a wanted portion, also has a noise portion, the incoming signal r(t) is initially passed through an antialiasing filter 1 which is usually in the form of a low-pass filter, in order to suppress the noise as far as possible. The filtered incoming signal x(t) resulting is then scanned in a device 2 with a clock 1/T and a delay constant $\tau$. From the filtered and scanned incoming signal x(k) an intermediate signal z(k) is then obtained with the aid of a device 3 functioning as a differential modulator which is used as the basis for estimating the frequency shift $\nu$ by an estimating device 4.

The method used by the estimating device 4 to estimate the frequency shift will be explained in more detail below.

Although the incoming signal r(t) has been passed through the filter 1 in order to suppress noise, the resulting filtered incoming signal x(t), apart from its wanted portion, also has a residual noise portion. For the complex envelope of the filtered and scanned incoming signal therefore:

$$x(k \cdot T + \tau) = s(k \cdot T + \tau) + n(k \cdot T + \tau)$$

applies.

In this case $s(k \cdot T + \tau)$ designates the wanted signal portion and $n(k \cdot T + \tau)$ the residual noise portion. The wanted signal portion $s(k \cdot T + \tau)$ of a complex CPFSK signal is defined as follows:

$$s(k \cdot T + \tau) = e^{j[2 \cdot \pi \cdot \nu \cdot (k \cdot T + \tau) + \theta]} \cdot \sqrt{\frac{2 \cdot E_b}{T}} \cdot e^{j\psi(k \cdot T, <\alpha_k>)}$$

In this case $\nu$ designates the frequency shift being estimated while $\theta$ represents an unknown phase shift. In addition $E_b$ designates the bit energy of each transmitted bit and $\psi(k \cdot T, <\alpha_k>)$ the phase angle at the interval $k \cdot T$. The phase angle is dependent on the phase changes $\alpha_i$ allocated to each transmitter symbol and the modulation index $\eta$ as follows:

$$\psi(k \cdot T, <\alpha_k>) = \pi \cdot \eta \cdot \sum_{i=0}^{k-1} \alpha_i$$

The intermediate signal $z(k \cdot T + \tau)$ is determined in the following way from the scanned complex envelope $x(k \cdot T + \tau)$ and its conjugated complex envelope $x^*(k \cdot T + \tau)$, whereby for CPFSK signals a delay parameter D is introduced, which for example in the case of MSK signals has the value $D=1$:

$$z(k \cdot T + \tau) = x^2(k \cdot D \cdot T + \tau) \cdot \{x^2([k-1] \cdot D \cdot T + \tau)\}^* = \{x(k \cdot D \cdot T + \tau) \cdot x^*([k-1] \cdot D \cdot T + \tau)\}^2$$

Over an observation period with $L_0$ values of the intermediate signal $z(k \cdot T + \tau)$ obtained in this way the estimated frequency shift $\nu$:

$$\nu = \frac{1}{4 \cdot \pi \cdot D \cdot T} \cdot \arg\{z(\tau) + z(D \cdot T + \tau) +$$
$$z(2 \cdot D \cdot T + \tau) + \ldots + z([L_0 - 1] \cdot D \cdot T + \tau)\}$$
$$= \frac{1}{4 \cdot \pi \cdot D \cdot T} \cdot \arg\left\{\sum_{i=0}^{L_0-1} z(i \cdot D \cdot T + \tau)\right\}$$

results.

By introducing the delay parameter D a generally valid formula for CPFSK signals is thus obtained to estimate the frequency shift $\nu$. For estimating the frequency shift $\nu$ of a CPFSK signal (L>1) a possible value of the delay parameter D is for example D=L, whereby L equals the number of symbols until the corresponding phase function q(t) has reached its end value (compare the above statements).

Figure 2:
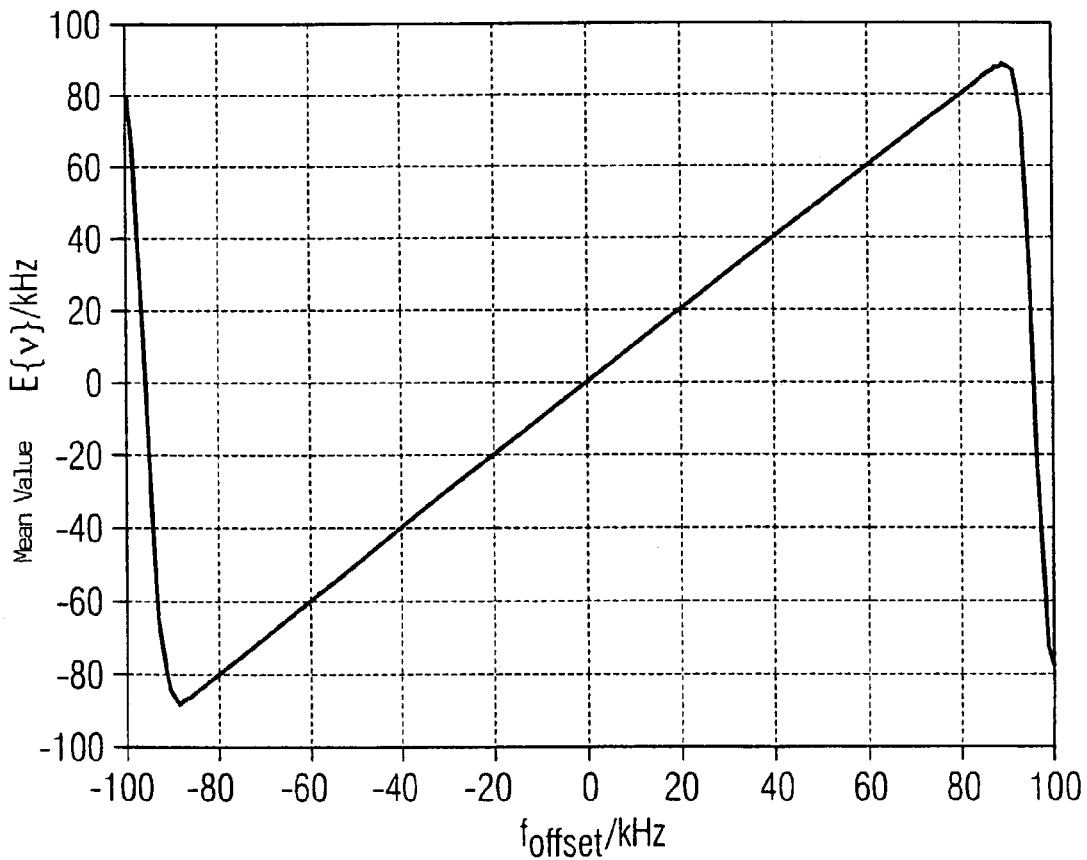

In FIG. 2 the mean frequency shift $\nu$ estimated using the method according to the invention is recorded in comparison to the actual frequency shift $f_{offset}$. This concerns the results of a simulation carried out for a GMSK signal ("Gaussian Minimum Shift Keying") with a signal to noise distance of 12 dB and a modulation index of $\eta=0.5$. The filter 1 had a bandwidth of $B \cdot T=0.5$ while the value D=3 was selected for the delay parameter. Further, to estimate the frequency shift $\nu$ an observation interval of the length $L_0=32$ was assumed. It can be seen from the illustration in FIG. 2 that very good estimation results can also be achieved for relatively short observation periods.

The estimating method according to the invention can be simply implemented for example with the aid of a mat-lab function designated below as "DM_CA_Frequency", which is called up with the parameters x, T, D and $L_0$ and as a result f produces the estimated value for the frequency shift:

function[*f*]=*DM_CA_Frequency*(x,T,D,L0)

z=(x(1:D:L0).*conj(x(1+D:D:L0+D))). ^2;

*f*=−angle)(−sum(z))/(4*pi*D*T);

Within the function first the help variable z of the differential modulator or the device 3 (compare FIG. 1) is defined, before the estimated value for the frequency shift is finally obtained from it by a summation over $L_0$ values of the help variable z.

What is claimed is:

1. A method for estimating the frequency shift of a continuous phase-frequency-shift keying (CPFSK) signal, comprising the steps of:
   a) scanning the CPFSK signal;
   b) determining intermediate signal values for the CPFSK signal scanned in step a); and
   c) determining an estimated value (v) for the frequency shift of the CPFSK signal by assessing a predefined number of $L_0$ consecutive intermediate signal values obtained in step b),
   whereby an integer delay parameter D is specified,
   whereby in step b) the intermediate signal values for intervals $k \cdot T + \tau$ are determined in each case from scanning values of the CPFSK signal obtained for intervals $k \cdot D \cdot T + \tau$ and $[k-1] \cdot D \cdot T + \tau$, whereby T designates a scanning period, with which the CPFSK signal is scanned in step a), k is a scanning index and $\tau$ is a delay constant, and whereby in step c) the estimated value (v) for the frequency shift is determined from the intermediate signal values thus obtained in step b) for intervals $i \cdot D \cdot T + \tau$ with $i = 0 \ldots L_0 - 1$, wherein the integer delay parameter D is variable and is selected depending on the type of CPFSK modulation used for the CPFSK signal.

2. The method according to claim 1, wherein the CPFSK signal $x(k \cdot T + \tau)$ scanned in step a) is present in complex form, and wherein the intermediate signal values $z(k \cdot T + \tau)$ of step b) are determined according to the equation $z \cdot (k \cdot T + \tau) = \{x(k \cdot D \cdot T + \tau) \cdot x([k-1] \cdot D \cdot T + \tau)\}^2$, whereby x* designates the conjugated complex form of the CPFSK signal, and wherein the estimated value v for the frequency shift is determined according to the equation $$v = \frac{1}{4 \cdot \pi \cdot D \cdot T} \cdot \arg \left\{ \sum_{i=0}^{L_0 - 1} z(i \cdot D \cdot T + \tau) \right\}.$$

3. The method according to claim 1, wherein the phase of the CPFSK signal during its modulation is changed in harmony with a predetermined phase function, the phase function reaches its end value after a predetermined number L of symbols of the CPFSK signal, and the value D=L is selected for the delay parameter.

4. The method according to claim 3, whereby the phase function allocated to the CPFSK signal is such that L>1 applies.

5. The method according to claim 1, further comprising the step of passing the CPFSK signal through a low-pass filter before being scanned in step a).

6. The method according to claim 1, wherein the CPFSK signal is a transmitted signal sent over a digital mobile radio system, and the step of determining the estimated frequency shift (v) of the CPFSK signal is carried out in a receiver of the digital mobile radio system, in order to correct the incoming CPFSK signal accordingly, depending on the estimated frequency shift (v).

* * * * *